United States Patent
Ichijo

(10) Patent No.: US 7,330,395 B2
(45) Date of Patent: Feb. 12, 2008

(54) METHOD AND SYSTEM FOR AUTOMATICALLY CALIBRATING SOUND LEVEL METER

(75) Inventor: Kazuo Ichijo, Tokyo (JP)

(73) Assignee: Rion Co., Ltd., Tokyo (JP)

( * ) Notice: Subject to any disclaimer, the term of this patent is extended or adjusted under 35 U.S.C. 154(b) by 0 days.

(21) Appl. No.: 10/576,896

(22) PCT Filed: Jan. 22, 2004

(86) PCT No.: PCT/JP2004/000545
§ 371 (c)(1),
(2), (4) Date: Nov. 13, 2006

(87) PCT Pub. No.: WO2005/071371
PCT Pub. Date: Aug. 4, 2005

(65) Prior Publication Data
US 2007/0137281 A1    Jun. 21, 2007

(51) Int. Cl.
H04B 17/00    (2006.01)
G01H 3/00    (2006.01)

(52) U.S. Cl. ..................................... 367/13

(58) Field of Classification Search ............... 367/13; 73/1.82; 381/56, 57, 58, 59, 60; 702/85, 702/103, 104
See application file for complete search history.

(56) References Cited

U.S. PATENT DOCUMENTS 5,729,612 A * 3/1998 Abel et al. ................. 381/56
2002/0067835 A1 * 6/2002 Vatter ........................ 381/58
2006/0039568 A1 * 2/2006 Lee et al. ................... 381/59
2007/0137281 A1 * 6/2007 Ichijo ........................ 73/1.82

FOREIGN PATENT DOCUMENTS

| EP | 1707927 A1 | * 10/2006 |
| JP | 05-90336 | 12/1993 |
| JP | 2001-304951 | 10/2001 |
| JP | 2001-349773 | 12/2001 |

OTHER PUBLICATIONS

Hiroaki Tatsunami, Akihisa Imai, "Onkyo Sokuteiki no JIS Kaisei", Nihon Onkyo Gakkaishi vol. 59, No. 10, 2003, pp. 622 to 627.

* cited by examiner

Primary Examiner—Dan Pihulic
(74) Attorney, Agent, or Firm—Carrier, Blackman & Associates, P.C.; William D. Blackman; Joseph P. Carrier

(57) ABSTRACT

A method and a system for automatically calibrating a sound level meter which achieves accurate and secure calibration of a sound level meter using a sound calibrator. The sound calibrator comprises a code signal generator and a calibration sound pressure generator. The sound level meter comprises a code signal discriminator, a mode switch for switching the mode into a calibration mode in response to the discrimination of the code signal discriminator, a gain adjuster for adjusting a gain of an amplifier such that the indicated value corresponds to the level of the calibration sound pressure in the calibration mode, and a calibration recorder for recording the calibration date and time, the sound pressure, the type, and the manufacturing number of the sound calibrator.

11 Claims, 2 Drawing Sheets

METHOD AND SYSTEM FOR AUTOMATICALLY CALIBRATING SOUND LEVEL METER

TECHNICAL FIELD

The present invention relates to a method and a system for automatically calibrating a sound level meter in which a sound level meter is automatically calibrated by using a sound calibrator.

BACKGROUND ART

When environmental noise is checked in accordance with regulations such as noise regulations, a precise noise level needs to be measured by using a sound level meter. In order to measure a precise noise level, a sound level meter must be periodically calibrated. For such calibration, predetermined accuracy is required in terms of legal regulations.

Conventionally, when a sound level meter is calibrated by using a sound calibrator, the sound calibrator is connected to a microphone of the sound level meter, and the amplification magnitude of an amplifier circuit or the like is manually adjusted such that the sound level meter indicates a predetermined value with respect to the sound pressure generated by the sound calibrator.

However, in the conventional calibration method, it is necessary to manually adjust the amplification magnitude of the amplifier or the like of the sound level meter while the sound pressure of the sound calibrator is checked. Therefore, there is a likelihood that the sound pressure for calibration is incorrectly read or the adjustment is incorrectly performed. More specifically, the likelihood of incorrect adjustment becomes high when the calibration is conducted in the measuring field.

Also, the sound pressure generated by the sound calibrator is slightly different even in a case of the same type. The calibration operator needs to read the sound pressure of the individual sound calibrator and adjust the value indicated by the sound level meter with respect to the sound pressure. In addition, even in the case of the same sound calibrator, since the transmission characteristic is different depending on the combination with the microphone of the sound level meter, it is not enough to simply correspond to the sound pressure of the sound calibrator, and thus correction in the sound level meter is needed. In order to perform such correction, it is necessary to review the description of the sound level meter.

The present invention was made to solve the above-mentioned problems of the conventional art, and the object of the present invention is to provide a method and a system for automatically calibrating a sound level meter which achieves accurate and secure calibration of a sound level meter.

SUMMARY OF THE INVENTION

In order to solve the above-mentioned problems, according to the first aspect of the present invention, there is provided a method for automatically calibrating a sound level meter by using a sound calibrator comprising the steps of generating a code signal based on sound from the sound calibrator, allowing the sound level meter to be switched into a calibration mode when receiving the code signal, and automatically calibrating the sound level meter so as to adjust the value indicated by the sound level meter to be a calibration sound pressure level of the code signal by using the sound calibrator.

According to the second aspect of the present invention, there is provided a system for automatically calibrating a sound level meter by using a sound calibrator, wherein the sound calibrator comprises a code signal generating means for generating a code signal based on sound and a calibration sound pressure generating means for generating calibration sound pressure, and the sound level meter comprises a code signal discriminating means for discriminating the code signal, a mode switching means for switching into a calibration mode in response to discrimination of the code signal discriminating means and a gain adjusting means for adjusting a gain of an amplifier such that the indicated value corresponds to the level of the calibration sound pressure in the calibration mode.

According to the third aspect of the present invention, in the system for automatically calibrating a sound level meter of the second aspect, the sound calibrator further comprises an information outputting means for outputting information such as a type or a manufacturing number of the sound calibrator in addition to information of the sound pressure.

According to the fourth aspect of the present invention, in the system for automatically calibrating a sound level meter of the third aspect, the sound level meter further comprises a memory means for receiving a signal generated by the sound calibrator and recording information such as the calibration date and time, the sound pressure, the type, the manufacturing number or the like of the sound calibrator so as to keep a calibration history.

DETAILED DESCRIPTION OF THE INVENTION

Figure 1:
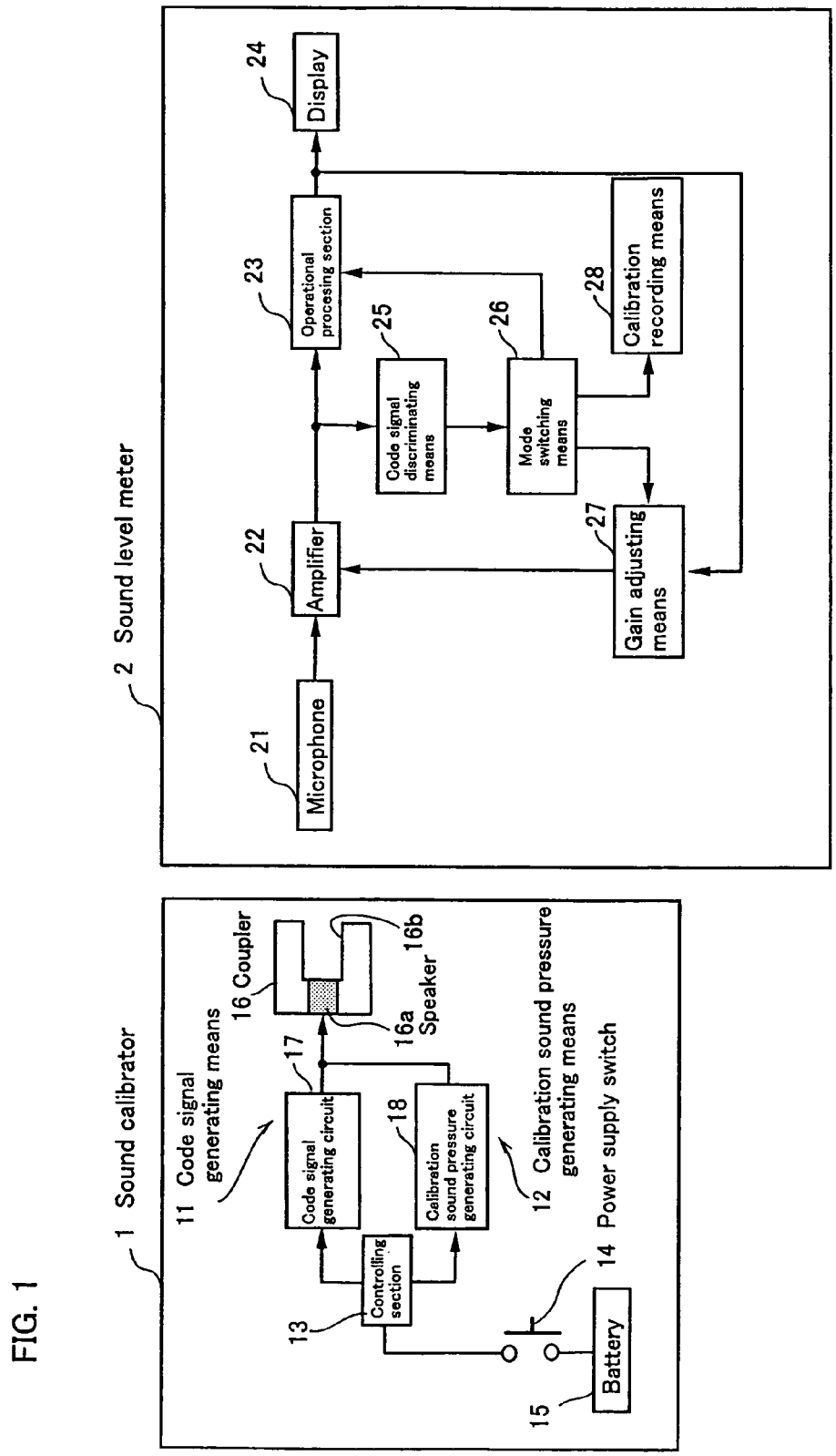
FIG. 1 is a block diagram of a system for automatically calibrating a sound level meter according to the present invention.
Figure 2:
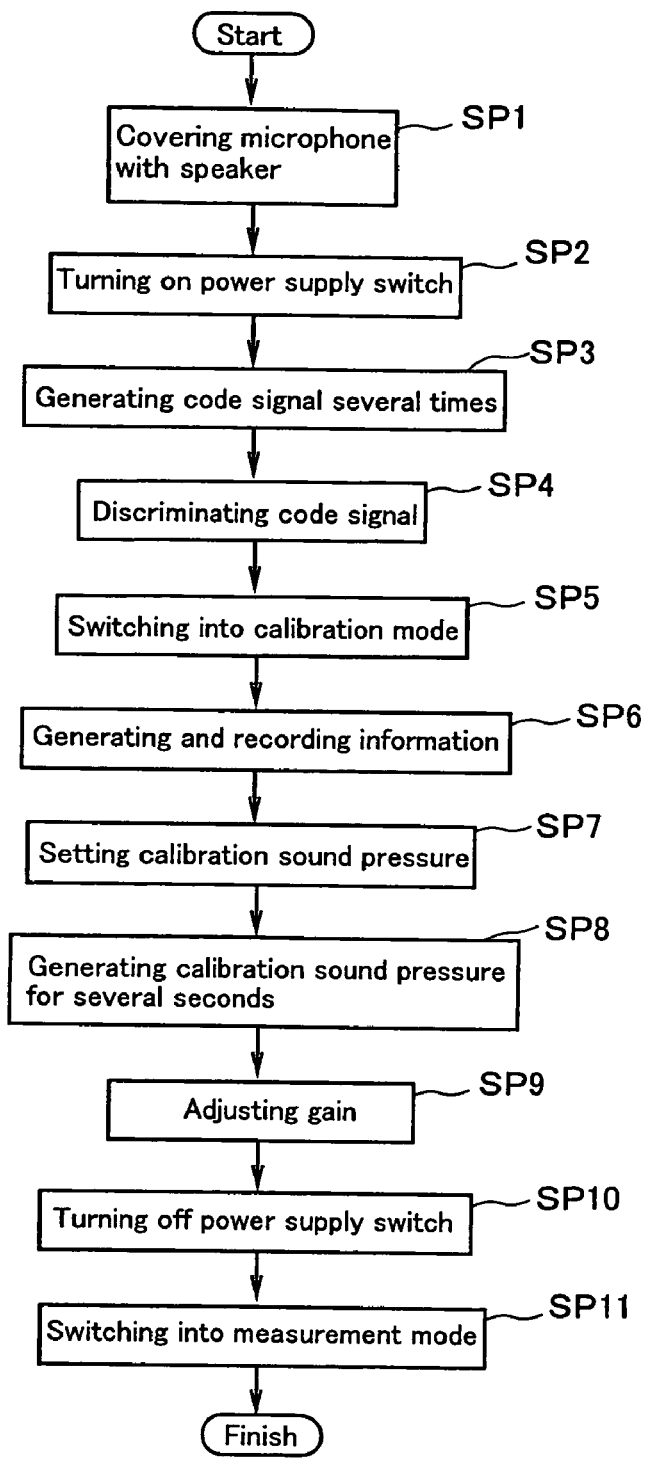
FIG. 2 is a flow chart of an operation sequence of the system for automatically calibrating a sound level meter according to the present invention.

Hereinafter, embodiments according to the present invention will be explained with reference to the attached drawings. FIG. 1 is a block diagram of a system for automatically calibrating a sound level meter according to the present invention, and FIG. 2 is a flow chart of its operation sequence.

The system for automatically calibrating a sound level meter according to the present invention is comprised of a sound calibrator 1 and a sound level meter 2.

The sound calibrator 1 is comprised of a code signal generating means 11, a calibration sound pressure generating means 12, a controlling section 13, a power supply switch 14, and a battery 15.

The code signal generating means 11 is comprised of a coupler 16 provided with a speaker 16a and a code signal generating circuit 17, and generates a code signal (pulse signal) based on sound. The calibration sound pressure generating means 12 is comprised of the coupler 16 provided with the speaker 16a and a calibration sound pressure generating circuit 18, and generates calibration sound pressure. The controlling section 13 controls the timing of generating a code signal and sound pressure in accordance with the time when the power supply switch 14 is turned on.

When the power supply switch 14 is pushed and turned on, the sound calibrator 1 allows the coupler 16 to output a code signal based thereon several times and thereafter output calibration sound pressure for several seconds, and the power supply switch 14 is automatically turned off. The code signal includes information such as the calibration date and time, the sound pressure, the type, and the manufacturing number of the sound calibrator 1, or the like. If an atmospheric pressure sensor is provided in the sound calibrator 1, atmospheric pressure information can be added to the code signal. A timer provided in the controlling section 13 determines the period of time from when the power supply switch 14 is pushed until when the power supply switch 14 is automatically turned off.

The code signal generated by the sound calibrator 1 is input to the code signal discriminating means 25 via the microphone 21 and the amplifier 22, and the code signal discriminating means 25 discriminates the content of the code signal. The mode switching means 26 switches the mode into a calibration mode or a measurement mode in response to the discrimination results of the code signal discriminating means 25. The gain adjusting means 27 adjusts a gain of the amplifier 22 such that the indicated value on the display 24 corresponds to the level of the calibration sound pressure in the calibration mode. The calibration recording means 28 records the sound pressure, the type, and the manufacturing number of the sound calibrator 1 as well as the calibration date and time.

The sound level meter 2 receives a code signal generated by the sound calibrator 1, discriminates the content, switches the mode into a calibration mode, adjusts a gain of the amplifier 22 such that the indicated value on the display 24 corresponds to the sound pressure level, and switches the mode back into a measurement mode after the adjustment. The sound level meter 2 undergoes calibration by switching the mode in accordance with the timing of the code signal and the calibration sound pressure generated by the sound calibrator 1.

Operation of the above-mentioned system for automatically calibrating a sound level meter according to the present invention and its calibration method will be explained with reference to the flow chart shown in FIG. 2.

First, in a step SP1, the microphone 21 of the sound level meter 2 in which the power supply is turned on is engaged with the coupler 16. A recessed portion 16b is formed in the coupler 16 such that the tip portion of the microphone 21 is engaged thereinto.

In a step SP2, the sound calibrator 1 is activated by pushing the power supply switch 14 of the sound calibrator 1. In a step SP3, the sound calibrator 1 generates a code signal based on sound several times via the coupler 16. Next, in a step SP4, when the microphone 21 of the sound level meter 2 receives the code signal, the code signal discriminating means 25 discriminates the content of the code signal which has been converted into the electrical signal.

In a step SP5, the mode switching means 26 of the sound level meter 2 switches the mode into a calibration mode with a calibration starting signal which is included in the code signal. In a step SP6, the sound calibrator 1 generates information such as the type, the manufacturing number, or the like, and the sound level meter 2 records such information. In a step SP7, the sound level meter 2 sets the value of the sound pressure level, which is included in the code signal, in the gain adjusting means 27.

Next, in a step SP8, the sound calibrator 1 generates calibration sound pressure for several seconds via the coupler 16. In a step SP9, while the microphone 21 of the sound level meter 2 receives the calibration sound pressure, the gain of the amplifier 22 is adjusted such that the indicated value on the display 24 corresponds to the level of the calibration sound pressure.

Next, in a step SP10, the power supply switch 14 is automatically turned off so as to cut off the power supply in the sound calibrator 1 after a lapse of a predetermined period of time which is set in the timer in advance.

Next, in a step SP11, when the gain adjustment of the amplifier 22 is finished in the sound level meter 2, the mode switching means 26 switches the calibration mode into the normal mode for measurement, and the calibration is finished.

INDUSTRIAL APPLICABILITY

As mentioned above, according to the present invention, since the sound level meter is automatically calibrated by receiving the code signal and the calibration sound pressure generated by the sound calibrator, there is no error in calibration. Also, since calibration can be finished in several seconds after setting the sound calibrator in the sound level meter and activating the sound calibrator, calibration can be performed easily without limiting the time and the place. In addition, since the code signal generated by the sound calibrator includes information of the calibration sound pressure, there is no error in calibration even if a sound calibrator having different calibration sound pressure is used.

Also, since the correction amount depending on the combination of the sound calibrator and the sound level meter can be stored in the sound level meter, it is possible to perform calibration without error based on the type and the sound pressure information of the sound calibrator. The code signal can include information such as the type and the manufacturing number of the sound calibrator as well as the calibration date and time, and the sound pressure. If the sound calibrator is provided with an atmospheric pressure sensor, the code signal can include atmospheric pressure information.

The sound level meter can record the above-mentioned information as well as the calibration date and time as a calibration history. The information can be utilized for maintaining and controlling the sound level meter.

Although there has been disclosed in detail above a exemplary embodiment of the invention, it will be understood by persons of ordinary skill in the art that variations and modifications may be made thereto without departing from the essence and spirit of the invention as defined in the appended claims.

The invention claimed is:

1. A method for automatically calibrating a sound level meter by using a sound calibrator comprising the steps of:
   generating a code signal based on sound from the sound calibrator;
   allowing the sound level meter to be switched into a calibration mode when receiving the code signal; and
   automatically calibrating the sound level meter so as to adjust a value indicated by the sound level meter to be a calibration sound pressure level of the code signal by using the sound calibrator.

2. A system for automatically calibrating a sound level meter by using a sound calibrator, wherein the sound calibrator comprises a code signal generating means for generating a code signal based on sound and a calibration sound pressure generating means for generating calibration sound pressure, and the sound level meter comprises a code signal discriminating means for discriminating the code signal, a mode switching means for switching into a calibration mode in response to discrimination of the code signal discriminating means and a gain adjusting means for adjusting a gain of an amplifier such that indicated value corresponds to the level of the calibration sound pressure in the calibration mode.

3. The system for automatically calibrating a sound level meter according to claim 2, wherein the sound calibrator further comprises an information outputting means for outputting information including at least one of a type or a manufacturing number of the sound calibrator, in addition to information of the sound pressure.

4. The system for automatically calibrating a sound level meter according to claim 3, wherein the sound level meter farther comprises a memory means for receiving a signal generated by the sound calibrator and recording information including at least one of the calibration date and time, the sound pressure, the type or the manufacturing number of the sound calibrator so as to keep a calibration history.

5. The system for automatically calibrating a sound level meter according to claim 2, wherein the sound level meter includes the amplifier.

6. The method for automatically calibrating a sound level meter according to claim 1, wherein the automatically calibrating step involves adjusting a gain of an amplifier of the sound level meter such that the indicated value corresponds to the level of the calibration sound pressure in the calibration mode.

7. The method for automatically calibrating a sound level meter according to claim 1, further including the step of outputting information including at least one of a type and a manufacturing number of the sound calibrator, in addition to information of the sound pressure.

8. The method for automatically calibrating a sound level meter according to claim 7, farther including the steps of receiving a signal generated by the sound calibrator and recording information including at least one of a calibration date and time, the sound pressure, the type and the manufacturing number of the sound calibrator so as to maintain a calibration history.

9. A system for automatically calibrating a sound level meter by using a sound calibrator, wherein the sound calibrator comprises a code signal generator which generates a code signal based on sound and a calibration sound pressure generator which generates calibration sound pressure, and the sound level meter comprises a code signal discriminator which discriminates the code signal, a mode switch for switching into a calibration mode in response to discrimination of the code signal discriminator and a gain adjuster which adjusts a gain of an amplifier of the sound level meter such that an indicated value corresponds to the level of the calibration sound pressure in the calibration mode.

10. The system for automatically calibrating a sound level meter according to claim 9, wherein the sound calibrator further comprises an information output which outputs information including at least one of a type or a manufacturing number of the sound calibrator, in addition to information of the sound pressure.

11. The system for automatically calibrating a sound level meter according to claim 10, wherein the sound level meter further comprises a memory which receives a signal generated by the sound calibrator and records information including at least one of the calibration date and time, the sound pressure, the type or the manufacturing number of the sound calibrator so as to maintain a calibration history.

* * * * *

UNITED STATES PATENT AND TRADEMARK OFFICE
CERTIFICATE OF CORRECTION

PATENT NO. : 7,330,395 B2  
APPLICATION NO. : 10/576896  
DATED : February 12, 2008  
INVENTOR(S) : Ichijo It is certified that error appears in the above-identified patent and that said Letters Patent is hereby corrected as shown below:

Column 3:
  Between lines 11 and 12, insert the following paragraph
--The sound level meter 2 is comprised of a microphone 21, an amplifier 22, an operational processing section 23, a display 24, a code signal discriminating means 25, a mode switching means 26, a gain adjusting means 27, a calibration recording means 28, and a battery (not shown in the drawing).--.

Column 5:
  Line 4, change "such that indicated value" to --such that an indicated value--.
  Line 15, change "farther comprises a memory" to --further comprises a memory--.
  Line 35, change "claim 7, farther including" to --claim 7, further including--.

Signed and Sealed this

Seventh Day of April, 2009

JOHN DOLL
*Acting Director of the United States Patent and Trademark Office*